(12) United States Patent
Lorenzen et al.

(10) Patent No.: US 12,326,922 B2
(45) Date of Patent: *Jun. 10, 2025

(54) SECURELY ISOLATING ONE OR MORE QUALIFIED DIGITAL IDENTIFIERS ASSOCIATED WITH A USER WHEN ACCESSING A DIGITAL SERVICE

(71) Applicant: Thirdwave Systems Inc., Dover, DE (US)

(72) Inventors: Matthew Lorenzen, Morgan Hill, CA (US); Peter Beck Jonas, Coatesville, PA (US)

(73) Assignee: Thirdwave Systems Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,094

(22) Filed: May 3, 2024

(65) Prior Publication Data

US 2025/0021633 A1    Jan. 16, 2025

Related U.S. Application Data

(63) Continuation of application No. 18/222,048, filed on Jul. 14, 2023, now Pat. No. 12,008,089.

(51) Int. Cl.
*G06F 21/31* (2013.01)

(52) U.S. Cl.
CPC ................... *G06F 21/31* (2013.01)

(58) Field of Classification Search
CPC ...................................................... G06F 21/31
See application file for complete search history.

(56) References Cited

U.S. PATENT DOCUMENTS

| | | | |
|---|---|---|---|
| 8,437,513 | B1 | 5/2013 | Derakhshani |
| 10,630,673 | B1 | 4/2020 | Lingampally |
| 10,902,418 | B2 | 1/2021 | Kaja |
| 12,033,140 | B2 * | 7/2024 | Petersen ............... G06Q 20/02 |
| 2009/0119299 | A1 | 5/2009 | Rhodes |
| 2010/0211960 | A1 | 8/2010 | Sirajuddin |
| 2011/0289547 | A1 | 11/2011 | Aggarwal |
| 2015/0025986 | A1 | 1/2015 | Patel |
| 2015/0113058 | A1 | 4/2015 | Zhang |
| 2017/0083924 | A1 | 3/2017 | Shah |

(Continued)

OTHER PUBLICATIONS

V. Sucasas, G. Mantas, M. Papaioannou and J. Rodriguez, "Attribute-Based Pseudonymity for Privacy-Preserving Authentication in Cloud Services," in IEEE Transactions on Cloud Computing, vol. 11, No. 1, pp. 168-184, Jan. 1-Mar. 2023. (Year: 2023).*

(Continued)

*Primary Examiner* — Kari L Schmidt
(74) *Attorney, Agent, or Firm* — Van Pelt, Yi & James LLP

(57) ABSTRACT

Information relating to a non-qualified digital identifier in a context of a digital service being provided is received. The non-qualified digital identifier is associated with one or more qualified digital identifiers. It is determined that the one or more qualified digital identifiers would be authorized for the (Continued)

digital service. The non-qualified digital identifier is authorized to access to the digital service as a result of the association of the nonqualified digital identifier with the one or more qualified digital identifiers.

20 Claims, 3 Drawing Sheets

(56) References Cited

U.S. PATENT DOCUMENTS

| | | |
|---|---|---|
| 2019/0020653 A1 | 1/2019 | Brown |
| 2019/0333054 A1 | 10/2019 | Cona |
| 2020/0034487 A1 | 1/2020 | Hernandez |
| 2020/0065872 A1* | 2/2020 | Tang ............... G06Q 30/0185 |
| 2020/0334674 A1 | 10/2020 | Youngblood |
| 2021/0105331 A1 | 4/2021 | Deo |
| 2021/0312432 A1 | 10/2021 | Young |
| 2022/0292588 A1 | 9/2022 | Collen |
| 2022/0374902 A1 | 11/2022 | Sabintsev |
| 2023/0113795 A1* | 4/2023 | Vlahovic ........... G06Q 20/4016 705/14.33 |
| 2023/0153465 A1 | 5/2023 | Noe |
| 2023/0224177 A1 | 7/2023 | Linton |
| 2023/0281604 A1 | 9/2023 | Robell |
| 2023/0298001 A1 | 9/2023 | Jethmalani |
| 2023/0334472 A1* | 10/2023 | Pene ............... G06Q 20/0655 |
| 2023/0370275 A1 | 11/2023 | Aspler-Yaskil |
| 2024/0020354 A1 | 1/2024 | Benedetto |
| 2024/0111886 A1* | 4/2024 | Patel ............... G06F 16/9535 |
| 2024/0152912 A1* | 5/2024 | Andral ............... G06Q 20/3829 |
| 2024/0187233 A1* | 6/2024 | Ethirkottai Sundararajan ............ G06Q 20/385 |
| 2024/0202721 A1* | 6/2024 | Hu ............... G06Q 20/401 |
| 2024/0320643 A1* | 9/2024 | Maheshwari ...... G06Q 30/0231 |

OTHER PUBLICATIONS

Das, Dipanjan, et al. "Understanding security issues in the NFT ecosystem." Proceedings of the 2022 ACM SIGSAC Conference on Computer and Communications Security. 2022, pp. 667-681. (Year: 2022).*

Alvar et al., "NFT-Based Data Marketplace with Digital Watermarking". In Proceedings of the 29th ACM SIGKDD Conference on Knowledge Discovery and Data Mining (KDD '23). Association for Computing Machinery, New York, NY, USA, 4756-4767. (Year: 2023).

Battah et al., "Blockchain and NFTs for Trusted Ownership, Trading, and Access of AI Models," in IEEE Access, vol. 10, pp. 112230-112249, 2022. (Year: 2022).

Gebreab et al., "NFT-Based Traceability and Ownership Management of Medical Devices," in IEEE Access, vol. 10, pp. 126394-126411, 2022. (Year: 2022).

Madine et al., "Blockchain and NFTs for Time-Bound Access and Monetization of Private Data," in IEEE Access, vol. 10, pp. 94186-94202, 2022 (Year: 2022).

* cited by examiner

SECURELY ISOLATING ONE OR MORE QUALIFIED DIGITAL IDENTIFIERS ASSOCIATED WITH A USER WHEN ACCESSING A DIGITAL SERVICE

CROSS REFERENCE TO OTHER APPLICATIONS

This application is a continuation of U.S. patent application Ser. No. 18/222,048 entitled SECURELY ISOLATING ONE OR MORE QUALIFIED DIGITAL IDENTIFIERS ASSOCIATED WITH A USER WHEN ACCESSING A DIGITAL SERVICE filed Jul. 14, 2023 which is incorporated herein by reference for all purposes.

BACKGROUND OF THE INVENTION

A user may be associated with a qualified digital identifier that is linked to one or more digital assets. A digital asset may be any digital representation of value which is recorded on a cryptographically secured distributed ledger or any similar technology. For example, a digital asset may be digital currency, digital music, a non-fungible token, etc. The user may desire to access a digital service, but the digital service requires the user to provide a digital identifier before the user can access the digital service. As a result, the user has potentially exposed their qualified digital identifier that is linked to one or more digital assets to one or more malicious actors that have gained control (either directly or indirectly) of the digital service.

BRIEF DESCRIPTION OF THE DRA WINGS

Various embodiments of the invention are disclosed in the following detailed description and the accompanying drawings.

DETAILED DESCRIPTION

Figure 1:
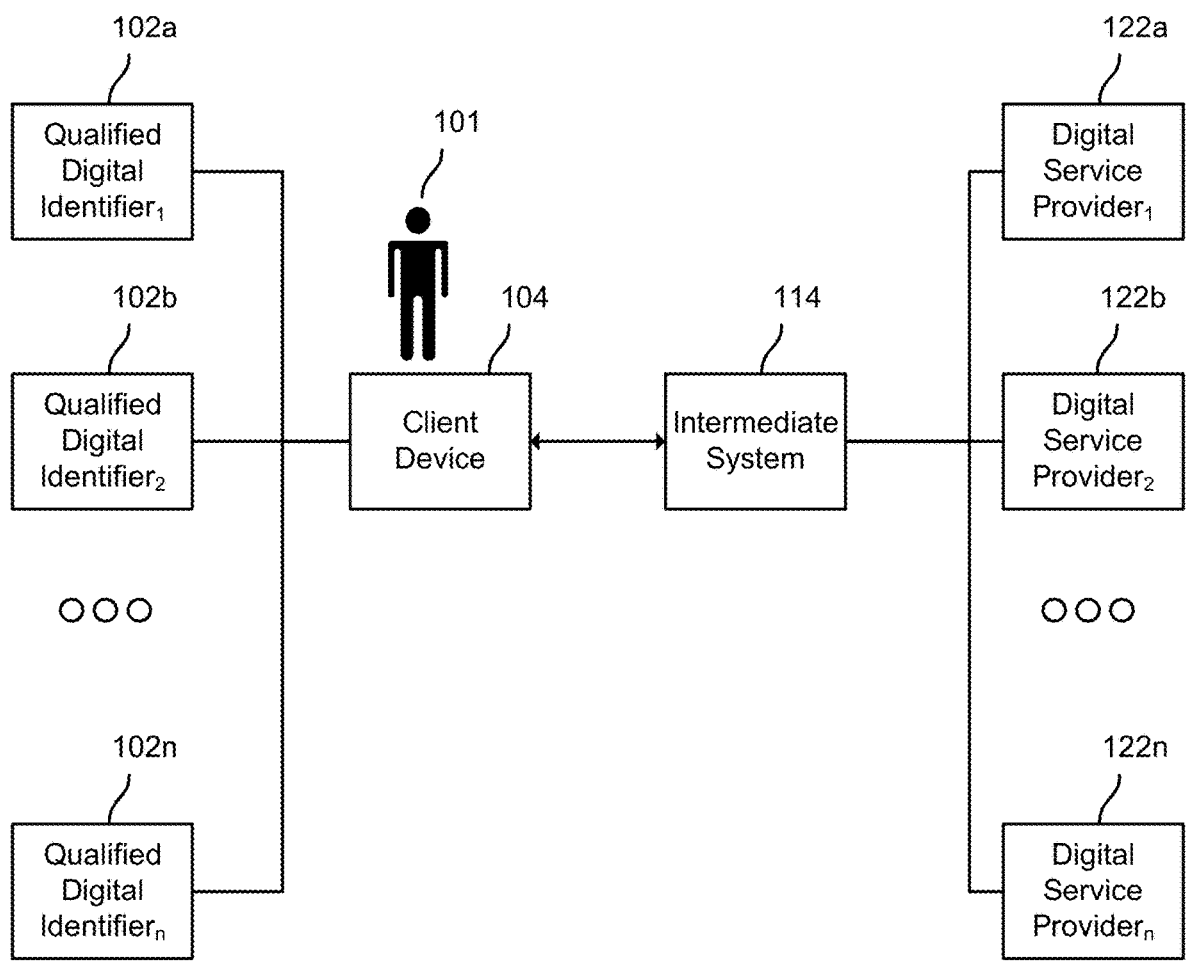
FIG. 1 is a block diagram illustrating a system for securely isolating one or more qualified digital identifiers associated with a user from one or more potential malicious actors when accessing a digital service in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to securely isolate one or more qualified digital identifiers associated with a user from one or more potential malicious actors when accessing a digital service is disclosed. The technique includes receiving, at an intermediate system, information that may be used in the generation of a non-qualified digital identifier. The information may include one or more phone numbers associated with a user, one or more email addresses associated with the user, one or more social media account handle associated with the user, and/or any identifying information associated with the user. The intermediate system generates the non-qualified digital identifier for the user based on the received information.

The technique further includes associating the non-qualified digital identifier with one or more qualified digital identifiers. The intermediate system verifies that the user is the owner of one or more qualified digital identifiers that are linked to one or more corresponding digital assets. In response to a qualified digital identifier being verified, the user is able to utilize non-qualified digital identifier for one or more digital services in place of utilizing the qualified digital identifier. This enables the user to utilize the non-qualified digital identifier in lieu of a qualified digital identifier to access the one or more digital services. A user may be associated with at least one qualified digital identifier that is associated with one or more valuable digital assets (e.g., a digital asset having a monetary value above a threshold).

A qualified digital identifier is an identifier that is linked to one or more digital assets. A non-qualified digital identifier is an identifier that is not linked to one or more digital assets.

The technique further includes determining whether at least one of the one or more qualified digital identifiers associated with a user would be authorized to access a digital service associated with a digital service provider. A digital service provider may offer a digital service. The digital service provider may establish one or more requirements to access the digital service. In response to receiving the offer, the intermediate system may determine a subset of non-qualified digital identifiers from a set of non-qualified digital identifiers that qualify for the digital service offer. For example, a digital service provider may offer a digital service to a set of users that are associated with a corresponding qualified digital identifier that are linked to one or more digital assets having a monetary value above a threshold.

The intermediate system may determine whether at least one of the qualified digital identifiers associated with a user meets the one or more requirements needed to access the digital service. In some embodiments, at least one of the qualified digital identifiers associated with the user meets the one or more requirements needed to access the digital service. In response to determining that at least one of the one or more qualified digital identifiers meets the one or more requirements needed to access the digital service, the technique further includes the intermediate system authorizing the non-qualified digital identifier to access the digital service as a result of the association of the non-qualified digital identifier with the at least one of one or more qualified digital identifiers. Even though the non-qualified digital identifier, by itself, is not sufficient to satisfy the one or more requirements associated with the digital service, the intermediate system may authorize, on behalf of the digital service provider, the digital service for the user in response to determining that the user is associated with at least one qualified digital identifier that satisfies the one or more requirements needed to access the digital service. This enables a user to access one or more digital services with which they are qualified, but for the fact that they are utilizing a non-qualified digital identifier to access the digital service.

Utilizing a non-qualified digital identifier to access a digital service may prevent a malicious actor from accessing one or more digital assets that are linked to one or more qualified digital identifiers associated with the user. A particular digital service may require a user to own a non-fungible token (NFT) have a particular value before the particular digital service is offered to the user. However, a malicious actor may host a spoof site for the particular digital service or provide to a user a link to the particular digital service that causes the NFT to be automatically transferred to the malicious actor. Since the non-qualified digital identifier is not linked to any of the digital assets owned by the user, the malicious actor is unable to potentially gain access to the digital assets owned by the user, especially valuable digital assets owned by the user. At most, the malicious actor may utilize the non-qualified digital identifier to access one or more digital services as if the malicious actor is the user. The "air gap" between the user's one or more qualified digital identifiers and one or more digital service providers offering one or more digital services provides an extra layer of security that instills confidence to the user that they may use the one or more digital services without worrying about their one or more digital assets becoming compromised.

In some embodiments, none of the qualified digital identifiers associated with the user meets the one or more requirements needed to access the digital service. As a result, the user is unable to access the digital service.

FIG. 1 is a block diagram illustrating a system for securely isolating one or more qualified digital identifiers associated with a user from one or more potential malicious actors when accessing a digital service in accordance with some embodiments. In the example shown, client device 104 associated with user 101 is in communication with intermediate system 114. Client device 104 may be a desktop computer, a laptop computer, a server, a tablet, a smartphone, or any other computing device. Intermediate system 114 may be a server, a virtual machine running on one or more servers, a containerized application across one or more servers, a cloud application, or any other computing device.

Intermediate system 114 is in communications with digital service providers 122a, 122b, . . . , 122n. Although FIG. 1 depicts intermediate system 114 being in communication with three digital service providers, intermediate system 114 may be in communication with 1:n digital service providers.

User 101 is associated with qualified digital identifiers 102a, 102b, . . . , 102n. Although FIG. 1 depicts user 101 being associated with three qualified digital identifiers, user 101 may be associated with 1:n qualified digital identifiers. A qualified digital identifier is an identifier that is linked to one or more digital assets. For example, a qualified digital identifier may be the identifier associated with a crypto wallet. A digital asset may be digital currency, digital music, a non-fungible token, etc. In some embodiments, user 101 is associated with a plurality of qualified digital identifiers. In some embodiments, a first qualified digital identifier of the plurality of qualified digital identifiers is associated with a first blockchain and a second qualified digital identifier is associated with a second blockchain. In some embodiments, a first qualified digital identifier of the plurality of qualified digital identifiers is associated with a first blockchain and a second qualified digital identifier of the plurality of qualified digital identifiers is also associated with the first blockchain.

Intermediate system 114 may provide user 101 with a particular non-qualified digital identifier. User 101 may provide via client device 104 information associated with user 101. The information may include one or more phone numbers associated with user 101, one or more email addresses associated with user 101, one or more social media account handle associated with user 101, and/or any identifying information associated with user 101. In response to receiving the information, intermediate system 114 may generate a particular non-qualified digital identifier for user 101. The particular non-qualified digital identifier may enable user 101 to access one or more digital services provided by digital service providers 122a, 122b, . . . , 122n.

Intermediate system 114 may associate the particular non-qualified digital identifier associated with user 101 with the qualified digital identifiers 102a, 102b, . . . , 102n. Intermediate system 114 may request user 101 to verify that user 101 is the owner of the qualified digital identifiers 102a, 102b, . . . , 102n. For example, intermediate system 114 may request user 101 to add a qualified digital identifier to be associated with their non-qualified digital identifier by having user 101 sign into an account associated with the qualified digital identifier. In response to the qualified digital identifiers 102a, 102b, . . . , 102n being verified, intermediate system 114 associates the qualified digital identifiers 102a, 102b, . . . , 102n with the non-qualified digital identifier associated with user 101.

Intermediate system 114 may receive an offer for a digital service (e.g., an online game, an online platform, etc.) from one of the digital service providers 122a, 122b, . . . , 122n. The digital service provider may establish one or more requirements to access the digital service. In response to receiving the offer, intermediate system 114 may determine a subset of non-qualified digital identifiers from a set of non-qualified digital identifiers that qualify for the digital service offer. Non-qualified digital identifiers included in the subset satisfy the one or more requirements to access the digital service. Each non-qualified digital identifier included in the set is associated with a corresponding user. Intermediate system 114 may determine the subset of non-qualified digital identifiers by determining a corresponding genuineness score for each user associated with a non-qualified digital identifier included in the set of non-qualified digital identifiers and ranking each non-qualified digital identifier included in the set based on the corresponding genuineness score. A genuineness score indicates a likelihood that a particular user is the target audience for a particular digital service. The determined subset of non-qualified digital identifiers may correspond to users having a particular genuineness score.

A genuineness score associated with a user may be based on one or more factors associated with a qualified digital identifier, such as a number of days since a qualified digital identifier was created, a number of transactions associated with a qualified digital identifier, a monetary value associated with a qualified digital identifier, a number of NFTs held by a qualified digital identifier, a number of NFTs previously held by a qualified digital identifier, an average hold time of an NFT associated with a qualified digital identifier, an average sale time of an NFT associated with a qualified digital identifier, a specific NFT collective associated with a qualified digital identifier, a likelihood that a qualified digital identifier is associated with a bot, a proximity of a qualified digital identifier to other quality digital identifiers.

A qualified digital identifier may be included in a whitelist of qualified digital identifiers. Intermediate system 114 may determine whether any of the qualified digital identifiers 102a, 102b, . . . , 102n are included in the whitelist of qualified digital identifiers. In response to determining that at least one of the qualified digital identifiers 102a, 102b, . . . , 102n are included in the whitelist of qualified digital identifiers, intermediate system 114 may include the particular non-qualified digital identifier associated with user 101 in the subset of non-qualified digital identifiers.

A qualified digital identifier may be included in a blacklist of qualified digital identifiers. Intermediate system 114 may determine whether any of the qualified digital identifiers 102a, 102b, . . . , 102n are included in the blacklist of qualified digital identifiers. In response to determining that at least one of the qualified digital identifiers 102a, 102b, . . . , 102n are included in the blacklist of qualified digital identifiers, intermediate system 114 may exclude the particular non-qualified digital identifier associated with user 101 in the subset of non-qualified digital identifiers.

In some embodiments, intermediate system 114 determines that a non-qualified digital identifier is associated with a bot. In response, intermediate system 114 may exclude the non-qualified digital identifier associated with the bot from the subset of non-qualified digital identifiers.

Intermediate system 114 may determine, for user 101, whether at least one of the qualified digital identifiers 102a, 102b, . . . , 102n meets the one or more requirements needed to access the digital service offer. The non-qualified digital identifier, by itself, is not sufficient to satisfy the one or more requirements associated with the digital service. However, user 101 may be associated with at least one qualified digital identifier that satisfies the one or more requirements needed to access the digital service.

In response to determining that at least one of the qualified digital identifiers 102a, 102b, . . . , 102n satisfies the one or more requirements associated with the digital service, intermediate system 114 authorizes, on behalf of the digital service provider, the particular non-qualified digital identifier to access as a result of the association of the non-qualified digital identifier with the at least one of one or more qualified digital identifiers. User 101 may provide, via client device 104, the particular non-qualified digital identifier to the digital service provider to access the digital service. In response to receiving the particular non-qualified digital identifier, the digital service provider permits user 101 via client device 104 to access the digital service.

In some embodiments, a digital service provider provides one or more incentives for accessing a digital service. For example, digital service provider 122a may provide an incentive (e.g., a digital asset) to user 101 for accessing a digital service associated with digital service provider 122a in lieu of accessing a digital service associated with digital service provider 122b.

In some embodiments, intermediate system 114 receives from a digital service provider an offer for a digital product. Intermediate system 114 may identify one or more non-qualified digital identifiers for the digital product in a manner as described herein with respect to digital services.

Figure 2:
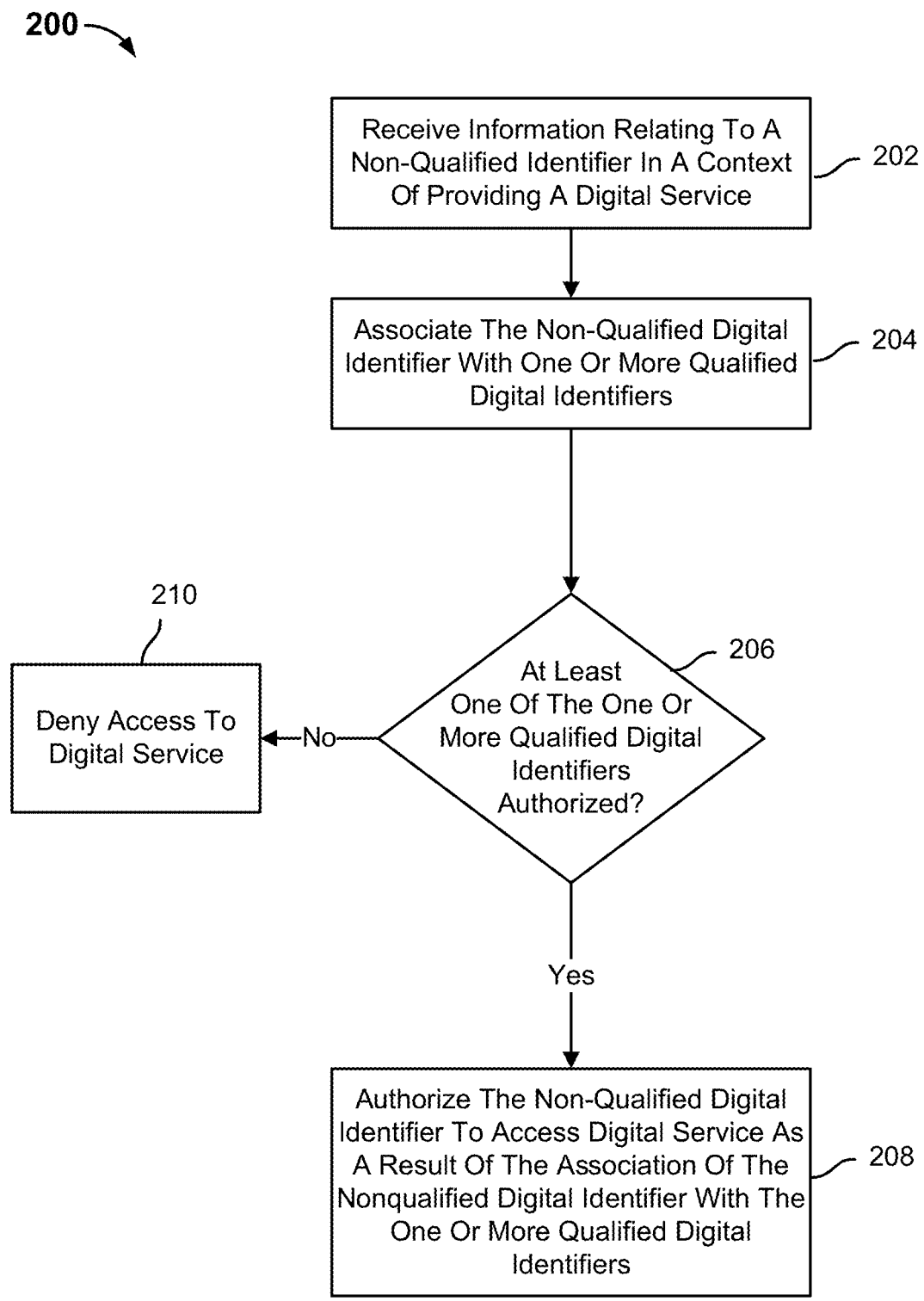
FIG. 2 is a flow diagram illustrating an embodiment of a process for securely isolating one or more qualified digital identifiers associated with a user from one or more potential malicious actors when accessing a digital service in accordance with some embodiments.

FIG. 2 is a flow diagram illustrating an embodiment of a process for securely isolating one or more qualified digital identifiers associated with a user from one or more potential malicious actors when accessing a digital service in accordance with some embodiments. In the example shown, process 200 may be implemented by an intermediate system, such as intermediate system 114.

At 202, information relating to a non-qualified digital identifier in a context of providing a digital service is received. The information may include one or more phone numbers associated with a user, one or more email addresses associated with the user, one or more social media account handle associated with the user, and/or any identifying information associated with the user. An intermediate system generates the non-qualified digital identifier for the user based on the received information.

At 204, the non-qualified digital identifier is associated with one or more qualified digital identifiers associated with a user. The intermediate system verifies that the user is the owner of one or more qualified digital identifiers that are linked to one or more corresponding digital assets. In response to a qualified digital identifier being verified, the user is able to utilize non-qualified digital identifier for one or more digital services in place of utilizing the qualified digital identifier. This enables the user to utilize the non-qualified digital identifier in lieu of a qualified digital identifier to access the one or more digital services.

At 206, it is determined whether at least one of the one or more qualified digital identifiers is authorized to access the digital service. A qualified digital identifier is an identifier that is linked to one or more digital assets. A digital service provider may offer a digital service. The digital service provider may establish one or more requirements to access the digital service. In response to receiving the offer, the intermediate system may determine a subset of non-qualified digital identifiers from a set of non-qualified digital identifiers that qualify for the digital service offer. For example, a digital service provider may offer a digital service to a set of users that are associated with a corresponding qualified digital identifier that are linked to one or more digital assets having a monetary value above a threshold. Other thresholds may be used, such as qualified digital identifier age, frequency of use of the qualified digital identifier, etc. The intermediate system may determine whether at least one of the qualified digital identifiers associated with a user meets the one or more requirements needed to access the digital service. In some embodiments, at least one of the qualified digital identifiers associated with the user meets the one or more requirements needed to access the digital service. For example, the user may have associated with a qualified digital identifier that is linked to one or more assets having the threshold value. In some embodiments, none of the qualified digital identifiers associated with the user meets the one or more requirements needed to access the digital service. For example, the user is not associated with any qualified digital identifiers that are linked to one or more assets having the threshold value.

In response to a determination that at least one of the one or more qualified digital identifiers is authorized to access the digital service, process 200 proceeds to 208. In response to a determination that none of the one or more qualified digital identifiers is authorized to access the digital service, process 200 proceeds to 210.

At 208, on behalf of the digital service provider, the intermediate system authorizes the non-qualified digital identifier associated with the user to access the digital service as a result of the association of the non-qualified digital identifier with the at least one of the one or more qualified digital identifiers. Even though the non-qualified digital identifier, by itself, is not sufficient to satisfy the one or more requirements associated with the digital service, the intermediate system may authorize, on behalf of the digital service provider, the digital service for the user in response to determining that the user is associated with at least one qualified digital identifier that satisfies the one or more requirements needed to access the digital service. This enables a user to access one or more digital services with which they are qualified, but for the fact that they are utilizing a non-qualified digital identifier to access the digital service.

Utilizing a non-qualified digital identifier to access a digital service may prevent a malicious actor from accessing one or more digital assets that are linked to one or more qualified digital identifiers associated with the user. A particular digital service may require a user to own an NFT have a particular value before the particular digital service is offered to the user. However, a malicious actor may host a spoof site for the particular digital service or provide to a user a link to the particular digital service that causes the NFT to be automatically transferred to the malicious actor. Since the non-qualified digital identifier is not linked to any of the digital assets owned by the user, the malicious actor is unable to potentially gain access to the digital assets owned by the user, especially valuable digital assets owned by the user. At most, the malicious actor may utilize the non-qualified digital identifier to access one or more digital services as if the malicious actor is the user. The "air gap" between the user's one or more qualified digital identifiers and one or more digital service providers offering one or more digital services provides an extra layer of security that instills confidence to the user that they may use the one or more digital services without worrying about their one or more digital assets becoming compromised.

At 210, access to the digital service is denied.

Figure 3:
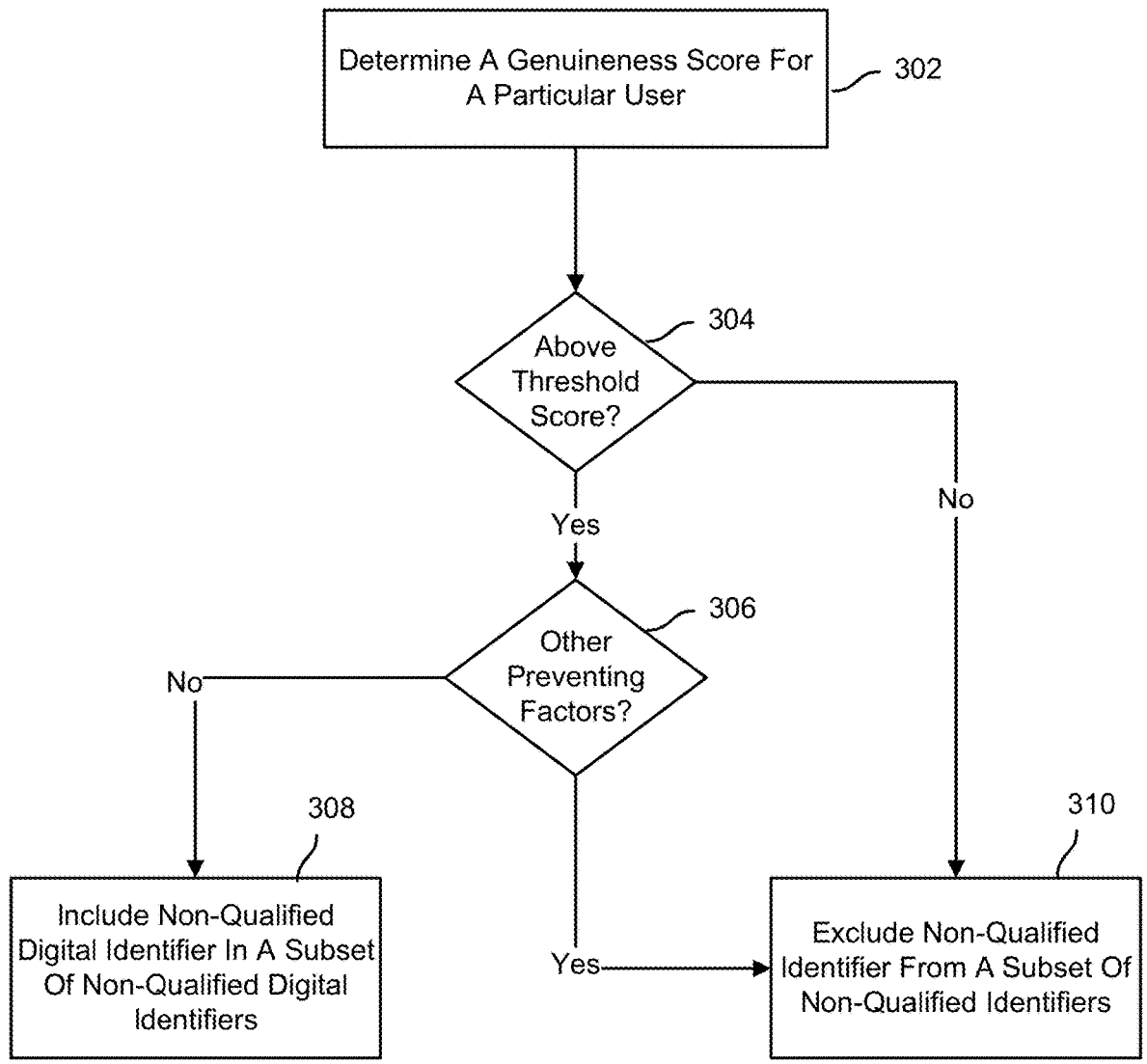
FIG. 3 is a flow diagram illustrating a process of determining whether at least one of the one or more qualified digital identifiers associated with a user is authorized to access a digital service in accordance with some embodiments.

FIG. 3 is a flow diagram illustrating a process of determining whether at least one of the one or more qualified digital identifiers associated with a user is authorized to access a digital service in accordance with some embodiments. In the example shown, process 300 is implemented by an intermediate system, such as intermediate system 114. In some embodiments, process 300 is implemented to perform some or all of step 206 of process 200.

At 302, a genuineness score is determined for a particular user. A digital service provider may establish one or more requirements to access a digital service. In response to receiving the offer, the intermediate system may determine a subset of non-qualified digital identifiers from a set of non-qualified digital identifiers that qualify for the digital service offer. Each non-qualified digital identifier included in the set is associated with a corresponding user. A genuineness score indicates a likelihood that the particular user is the target audience for a particular digital service.

At 304, it is determined whether the genuineness score is above a threshold score. A genuineness score associated with a user may be based on one or more factors associated with a qualified digital identifier, such as a number of days since a qualified digital identifier was created, a number of transactions associated with a qualified digital identifier, a monetary value associated with a qualified digital identifier, a number of NFTs held by a qualified digital identifier, a number of NFTs previously held by a qualified digital identifier, an average hold time of an NFT associated with a qualified digital identifier, an average sale time of an NFT associated with a qualified digital identifier, a specific NFT collective associated with a qualified digital identifier, a likelihood that a qualified digital identifier is associated with a bot, a proximity of a qualified digital identifier to other quality digital identifiers.

In response to a determination that the genuineness score is above the threshold score, process 300 proceeds to 306. In response to a determination that the genuineness score is not above the threshold score, process 300 proceeds to 310.

At 306, it is determined whether there are one or more factors preventing the non-qualified digital identifier associated with the user from being included in a subset of non-qualified digital identifiers. A qualified digital identifier associated with a user may be included in a blacklist of qualified digital identifiers. The intermediate system may determine whether any of the qualified digital identifiers associated with a user are included in the blacklist of qualified digital identifiers. In response to determining that at least one of the qualified digital identifiers associated with the user is included in the blacklist of qualified digital identifiers, the intermediate system may exclude the non-qualified digital identifier associated with the user from the subset of non-qualified digital identifiers.

In some embodiments, the intermediate system determines that a non-qualified digital identifier is associated with a bot. In response, the intermediate system may exclude the non-qualified digital identifier associated with the bot from the subset of non-qualified identifiers despite the non-qualified digital identifier having a genuineness score above the threshold score.

In response to a determination that there are no factors preventing the non-qualified digital identifier associated with the user from being included in the subset of non-qualified digital identifiers, process 300 proceeds to 308.

In response to a determination that there is at least one factor factors preventing the non-qualified digital identifier associated with the user from being included in the subset of non-qualified digital identifiers, process 300 proceeds to 310.

At 308, the non-qualified digital identifier associated with the user is included in the subset of non-qualified digital identifiers. Non-qualified digital identifiers included in the subset satisfy the one or more requirements to access the digital service.

At 310, the non-qualified digital identifier associated with the user is excluded from the subset of non-qualified digital identifiers. Non-qualified digital identifiers excluded from the subset are prevented from accessing the digital service.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of authorizing a non-qualified digital identifier associated with a user, comprising:
receiving an offer for a digital service from a digital service provider, wherein the offer is available for a particular user having a genuineness score above a threshold;
determining from a set of non-qualified digital identifiers a subset of non-qualified digital identifiers that qualify for the digital service offer;
determining that a non-qualified digital identifier associated with the user is qualified for the digital service offer in part by determining that at least one of one or more qualified digital identifiers associated with the user would be authorized for the digital service; and
in response to determining that the at least one of the one or more qualified digital identifiers associated with the user would be authorized for the digital service, authorizing the non-qualified digital identifier associated with the user to access to the digital service.

2. The method of claim 1, receiving information relating to the non-qualified digital identifier associated with the user in a context of a digital service being provided.

3. The method of claim 2, wherein the information includes one or more phone numbers associated with the user, one or more email addresses associated with the user, one or more social media account handles associated with the user and/or any identifying information associated with the user.

4. The method of claim 1, further comprising associating the non-qualified digital identifier associated with the user with one or more qualified digital identifiers associated with the user.

5. The method of claim 4, wherein associating the non-qualified digital identifier associated with the user with one or more qualified digital identifiers associated with the user includes verifying that the user is an owner of the one or more qualified digital identifiers.

6. The method of claim 1, wherein the non-qualified digital identifier associated with the user is utilized to access one or more digital services in lieu of utilizing the one or more qualified digital identifiers associated with the user to access the one or more digital services.

7. The method of claim 1, wherein the at least one of the one or more qualified digital identifiers associated with the user is linked to one or more corresponding digital assets that cause the user to have a corresponding genuineness score above the threshold.

8. The method of claim 1, wherein determining that the at least one of the one or more qualified digital identifiers associated with the user would be authorized for the digital service includes determining whether to include the non-qualified digital identifier associated with the user in the subset of non-qualified digital identifiers from the set of non-qualified digital identifiers.

9. The method of claim 8, wherein determining whether to include the non-qualified digital identifier associated with the user in the subset of non-qualified digital identifiers from the set of non-qualified digital identifiers includes determining the corresponding genuineness score for the user.

10. The method of claim 9, wherein the corresponding genuineness score indicates a likelihood that the user is a target audience for the digital service.

11. The method of claim 9, wherein the corresponding genuineness score associated with the user is based on one or more factors associated with the one or more qualified digital identifiers.

12. The method of claim 11, wherein the one or more factors include a number of days since a qualified digital identifier of the one or more qualified digital identifiers was created, a number of transactions associated with the qualified digital identifier, a monetary value associated with the qualified digital identifier, a number of non-fungible tokens (NFTs) held by the qualified digital identifier, a number of NFTs previously held by the qualified digital identifier, an average hold time of an NFT associated with the qualified digital identifier, an average sale time of an NFT associated with the qualified digital identifier, a specific NFT collective associated with the qualified digital identifier, a likelihood that the qualified digital identifier is associated with a bot, a proximity of the qualified digital identifier to other quality digital identifiers.

13. The method of claim 11, wherein the corresponding genuineness score associated with the user indicates that at least one of the one or more qualified digital identifiers would be authorized for the digital service.

14. The method of claim 1, wherein the at least one of the one or more qualified digital identifiers is included in a whitelist of qualified digital identifiers.

15. A system, comprising:
a memory; and
a processor coupled to the memory and configured to:
receive an offer for a digital service from a digital service provider, wherein the offer is available for a particular user having a genuineness score above a threshold;
determine from a set of non-qualified digital identifiers a subset of non-qualified digital identifiers that qualify for the digital service offer;
determine that a non-qualified digital identifier associated with the user is qualified for the digital service offer in part by determining that at least one of one or more qualified digital identifiers associated with a user would be authorized for the digital service; and
in response to determining that the at least one of the one or more qualified digital identifiers associated with the user would be authorized for the digital service, authorize the non-qualified digital identifier associated with the user to access to the digital service.

16. The system of claim 15, wherein the at least one of the one or more qualified digital identifiers associated with the user is linked to one or more corresponding digital assets that cause the user to have a corresponding genuineness score above the threshold.

17. The system of claim 15, wherein the processor is further configured to associate the non-qualified digital identifier with one or more qualified digital identifiers includes verifying that the user is an owner of the one or more qualified digital identifiers.

18. The system of claim 15, wherein the non-qualified digital identifier is utilized to access one or more digital services in lieu of utilizing the one or more qualified digital identifiers to access the one or more digital services.

19. The system of claim 15, wherein to determine that the at least one of the one or more qualified digital identifiers associated with the user would be authorized for the digital service, the processor is configured to determine whether to include the non-qualified digital identifier associated with the user in the subset of non-qualified digital identifiers from the set of non-qualified digital identifiers.

20. A computer program product embodied in a non-transitory computer readable medium and comprising computer instructions for:

receiving an offer for a digital service from a digital service provider, wherein the offer is available for a particular user having a genuineness score above a threshold;

determining from a set of non-qualified digital identifiers a subset of non-qualified digital identifiers that qualify for the digital service offer;

determining that a non-qualified digital identifier associated with the user is qualified for the digital service offer in part by determining that at least one of one or more qualified digital identifiers associated with the user would be authorized for the digital service; and in response to determining that the at least one of the one or more qualified digital identifiers associated with the user would be authorized for the digital service, authorizing the non-qualified digital identifier associated with the user to access to the digital service.

* * * * *